United States Patent [19]

Ito et al.

[11] Patent Number: 5,671,354
[45] Date of Patent: Sep. 23, 1997

[54] METHOD OF ASSISTING SERVER ACCESS BY USE OF USER AUTHENTICATION INFORMATION HELD IN ONE OF SERVERS AND A METHOD OF ASSISTING MANAGEMENT USER ACCOUNT FOR USE OF SERVERS

[75] Inventors: Tsutomu Ito, Kanagawa; Toshio Hirosawa, Machida; Atsushi Ueoka, Ome; Motohide Kokunishi, Hachioji; Tadashi Yamagishi, Yokohama; Kouichi Nakatsu, Hadano, all of Japan

[73] Assignees: Hitachi, Ltd., Tokyo; Hitachi Computer Engineering Co., Ltd., Hadano, both of Japan

[21] Appl. No.: 606,099

[22] Filed: Feb. 23, 1996

[30] Foreign Application Priority Data

Feb. 28, 1995 [JP] Japan ..................................... 7-039510

[51] Int. Cl.[6] ..................................................... G06F 11/00
[52] U.S. Cl. .................. 395/187.01; 395/186; 364/222.5
[58] Field of Search ......................... 395/187.01, 188.01, 395/106; 364/222.5; 380/23, 25, 4

[56] References Cited

U.S. PATENT DOCUMENTS

| 5,073,933 | 12/1991 | Rosenthal | 380/25 |
| 5,241,594 | 8/1993 | Kung | 380/4 |
| 5,341,477 | 8/1994 | Pitkin | 395/200 |
| 5,388,211 | 2/1995 | Hornbuckle | 395/200 |
| 5,455,953 | 10/1995 | Russell | 395/187.01 X |
| 5,506,961 | 4/1996 | Carlson | 395/186 |
| 5,553,239 | 9/1996 | Heath | 395/187.01 |

OTHER PUBLICATIONS

"NIS and System Management by Name Server, " in SUN System Management Chapter 7, pp. 203–219 (1991).

Primary Examiner—Robert W. Beausoliel, Jr.
Assistant Examiner—Dieu-Minh Le
Attorney, Agent, or Firm—Antonelli, Terry, Stout & Kraus, LLP.

[57] ABSTRACT

User authentication information for network of a user and a name of a server to be accessed are sent from a client terminal to a user management equipment realized by one of servers which constitute a network system. The user management equipment sends the network address of that server and user authentication information registered for that server back to the client terminal. Using these pieces of information, the client terminal logs in that server. Each of the servers used by the user notifies the user management equipment of the actual accounts for the user at preferable times. Using the notified information, the user management equipment manages the actual accounts of each user. Each user can know the total of actual accounts for the servers used by accessing only the user management equipment.

11 Claims, 8 Drawing Sheets

FIG. 4

2 SERVER MANAGEMENT FILE — 74

| NETWORK INFORMATION | | SERVER INFORMATION | | | | |
|---|---|---|---|---|---|---|
| | | SERVER 1 | | | | |
| ID | PASSWORD | BUDGETARY ACCOUNT | ID | COMMAND | PASSWORD | COMMAND | ACTUAL ACCOUNT |
| 71 | 72 | 73 | 75 | 75A | 76 | 76A | 77 |
| | | | | | | | |
| | | | | | | | |
| | | | | | | | |

FIG. 5

3 NETWORK-USER MANAGEMENT FILE

| SERVER NAME | NETWORK ADDRESS |
|---|---|
| SERVER 1 | 133.144.10.2 |
| 78 | 79 |

METHOD OF ASSISTING SERVER ACCESS BY USE OF USER AUTHENTICATION INFORMATION HELD IN ONE OF SERVERS AND A METHOD OF ASSISTING MANAGEMENT USER ACCOUNT FOR USE OF SERVERS

BACKGROUND OF THE INVENTION

The present invention relates to a method of assisting the access to a network system composed of a plurality of servers that implement a host computer system, an electronic mail (called e-mail) system and the like and a method of assisting user account management.

In recent network systems, servers implementing different systems have been connected to the same network, so that any of the servers is available to the users.

A special example of such systems is described in Chapter 7 "NIS And System Management by Name Server," in "SUN System Management," Ascii Corp., 1991. As described, in a configuration having a plurality of server systems controlled by a single OS (Operating System) on a network, the registration of user authentication information is performed to only one of the server systems, the information then being made available to others of the server systems. This configuration makes it unnecessary for a user to additionally register the user's information to servers additionally connected to the server systems. Further, this configuration allows a user to log in on any of the server systems with the same user ID and the same password in the same procedure.

However, in a general network system incorporating a plurality of servers, user information must be registered for each server separately and logging in to each server must be performed using a procedure uniquely specified for each server. Generally, logging in to one of these servers requires a user to enter a network address of that server and the user authentication information such as a user ID and a password. Generally again, the user authentication information is different in format from server to server and must be entered using a procedure uniquely specified for each server.

For assisting the entry of the user authentication information, a so-called auto log-in is employed. In this method, a user enters in advance, a network address and user authentication information for each of the server systems on a network, into a communication program of a network terminal, such as a personal computer. If a user selects a desired server system to be accessed, the program accesses that server system with the network address entered for that server to access it, and then transmits the user authentication information entered for that server to the server.

If a user wants to know whether an account charged for his usage of various servers in the above-mentioned general network has exceeded his budget, the user must log into those servers to find accounts for this usage of respective servers and total these accounts. A network system manager also employs a similar method for determining the current account status of each user.

SUMMARY OF THE INVENTION

However, the above-mentioned conventional method in which auto log-in is used is inconvenient in that, a user must register auto log-in information for a plurality of servers in each of the client terminals, if the user wants to use the client terminals.

Further, in the above-mentioned conventional method, the user cannot use the auto log-in capability in a network terminal other than those incorporated with a communication program into which the required auto log-in information was previously entered. Therefore, the user cannot use this auto log-in capability for a computer terminal other than one he uses daily, for example, a network terminal usually used by another person or a personal computer (PC) not used daily as a network terminal.

Still further, in the conventional technique, a user or a network system manager logs in to each of servers connected to a network, to totalize accounts due for that user. Especially, when the network system manager must repeat this log-in and the totalizing operations for a lot of users, this requires a lot of time in accessing the servers and totalizing the accounts.

It is therefore an object of the present invention to provide a server access method for enabling a network terminal not holding log-in information for a server to log in to the server.

It is a more specific object of the present invention to provide a method of assisting users to access servers in a network system from various terminals, in case the servers require log-in information of different formats.

It is further object of the present invention to provide an account management assisting method for assisting management of an actual account for each user of a respective account for the user for servers in a network system.

According to the present invention, to attain the first mentioned object, one of the servers of a network system holds for each of the users having authorization to use at least part of the servers, user authentication information for each of the servers available to the user, for example, a user ID and a password, registered for the user, and user authentication information for using the network system, registered for the user, for example, a user ID for the network system and a password for the network system. When one of the users enters its user authentication information for using the network system and information for specifying a destination server, for example its server name, into one of the client terminals, these pieces of information are transmitted from the client terminal to the above-mentioned one of the servers. The above-mentioned one of the servers in turn transmits user authentication information to the above-mentioned client terminal. This user authentication information is information registered for the user having the transmitted user authentication information and for allowing the user to access the destination server specified by the transmitted destination server specifying information. The client terminal logs in on the above-mentioned destination server by use of the transmitted user authentication information for that server.

The present invention allows the user to log in on any of the servers from a terminal in which the user authentication information for servers connected to a network system has not been registered in advance.

According to the present invention, to attain the above-mentioned further object, one of the servers connected to the network system collects account information from each of the servers that a user having authorization for using them has used. The above-mentioned one server holds the account information collected for each of the users having authorization for accessing the network. When one of the users enters its user authentication information for using the network system and a request for account display into one of the client terminals, these pieces of information are transmitted from the client terminal to the above-mentioned one server; the above-mentioned one server transmits to the client terminal the account information associated with each of the servers and held in the above-mentioned one server for the user having the transmitted user authentication information. The client terminal then displays the transmitted account information on a display device.

The present invention allows the user to collectively know the actual accounts for the servers connected to the network, by logging only in one server. He need not log in on each of the servers and to totalize their actual accounts.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 4 is a diagram illustrating the general constitution of a server management file (2) shown in FIG. 1;

FIG. 5 is a diagram illustrating the general constitution of a network user management file (3) shown in FIG. 1;

DETAILED DESCRIPTION OF PREFERRED EMBODIMENTS

A server access assisting method and an account management assisting method associated with the present invention will be described in further detail by way of a preferred embodiment and modifications thereof with reference to the accompanying drawings.

Figure 1:
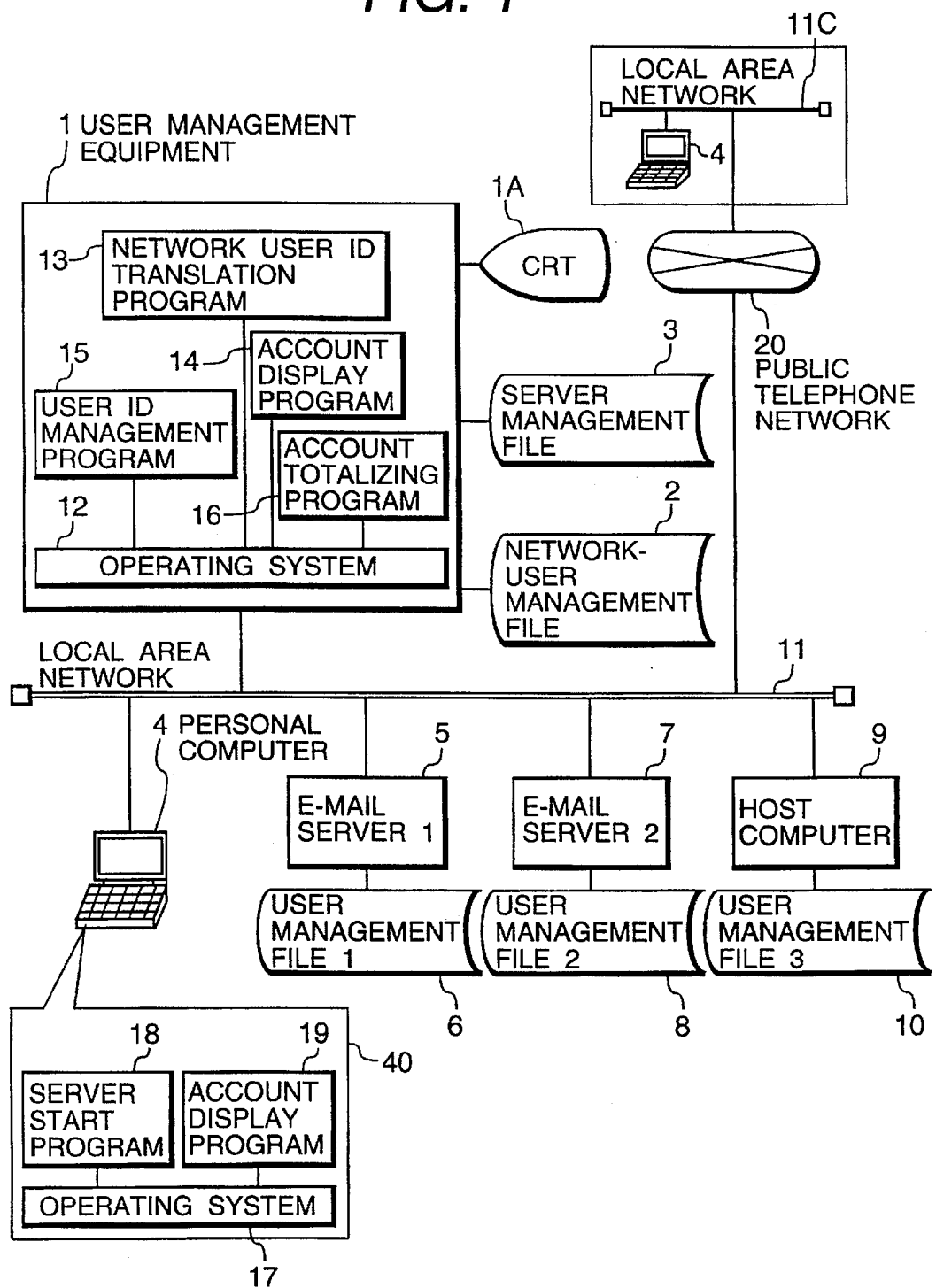
FIG. 1 is a schematic diagram illustrating a system to which a server access method according to the present invention is applied.

FIG. 1 shows a schematic diagram illustrating a network system employing the present invention. In this system, a server group including an e-mail server No. 1 (5), an e-mail server No. 2 (7), and a host computer 9 are connected via a local area network (LAN) 11 to a personal computer (PC) 4, which is used as a client terminal for these servers, and user management equipment 1 for managing registration information of a network user and user account information. When viewed from the terminal, the user management equipment 1 is also one of the servers. Further, the server group is connected via a public telephone network 20 to a remote PC 4A connected to a LAN 11C provided at a destination of a business trip, a satellite office or the like. This remote PC 4A may be a portable terminal.

The PC 4 contains a server start program 18 and an account display program 19 which are characteristic to the present embodiment and operate under control of an operating system (OS) 17. Each program is provided common to the servers 5, 7, and 9. The server start program 18 logs in to the user management equipment 1, by sending it user authentication information necessary to log in to the user management equipment 1, such as the network user ID and password, and a name of a server to be used. Then, the server start program 18 receives user authentication information for the server to be accessed, such as an ID and a password of the user and such information necessary for logging in the server as a network address (IP address) of the server. Based on these pieces of information, the PC 4 logs in to the server to make communication with the server.

The account display program 19 is started when the user wants to display the account information for all servers in the network. When started, the account display program 19 communicates with the user management equipment 1 to receive the account information for each server associated with the user and displays the received information.

The user management equipment 1 is characteristic to the present embodiment and is realized by a personal computer or a workstation. In the user management equipment 1, a network user management file 2 stores log-in information, such as user authentication information like a user ID and a password for each user, and user authentication information for each server like an ID and a password, and user account information such as a budgetary account for the whole network for each user and an actual account for each server. A server management file 3 stores address information about each of the servers connected to the network.

The user management equipment 1 comprises a network user ID translation program 13, a user ID management program 15, an account display program 14, and an account totalizing program 16 and so on.

When the user wants to use one of the server systems, the network user ID translation program 13 communicates with the server start program 18 in PC 4, and verifies the user-specified network ID and password. If the network ID and password are verified to be correct, the network user ID translation program 13 transmits to the server start program 18 the user's authentication information registered for a server to be accessed and a network address of that server. Consequently, once the user registers the user authentication information for plural servers in the network into the user management equipment 1, the user can get the user authentication information for a desired one of the servers from any terminal, to log in the desired server. It should be noted that the user ID management program 15 is for registering the user IDs and passwords for the network and the user IDs and passwords for other servers.

The account totalizing program 16 is started by a server accessed by the user to receive the account information about the user from that server. The account totalizing program 16 always holds the account information thus received for each user and for each of the servers in the network.

When the account display program 19 in PC 4 is started by the user, the account display program 14 in the user management equipment 1 notifies the account display program 19 of the account status of the user for all servers in the network. Therefore, the user does not need to access each server to check for the user's account status. Instead, the user needs to access only the user management equipment 1 to get the account status.

The servers 5, 7, and 9 have user management files 6, 8, and 10, respectively, which hold the actual accounts of each user along with the user authentication information of the user.

In what follows, the system of the present embodiment and its operations will be described in more detail.

(1) Server start procedure

First, a server start procedure will be described with reference to FIGS. 2 and 3.

Figure 2:
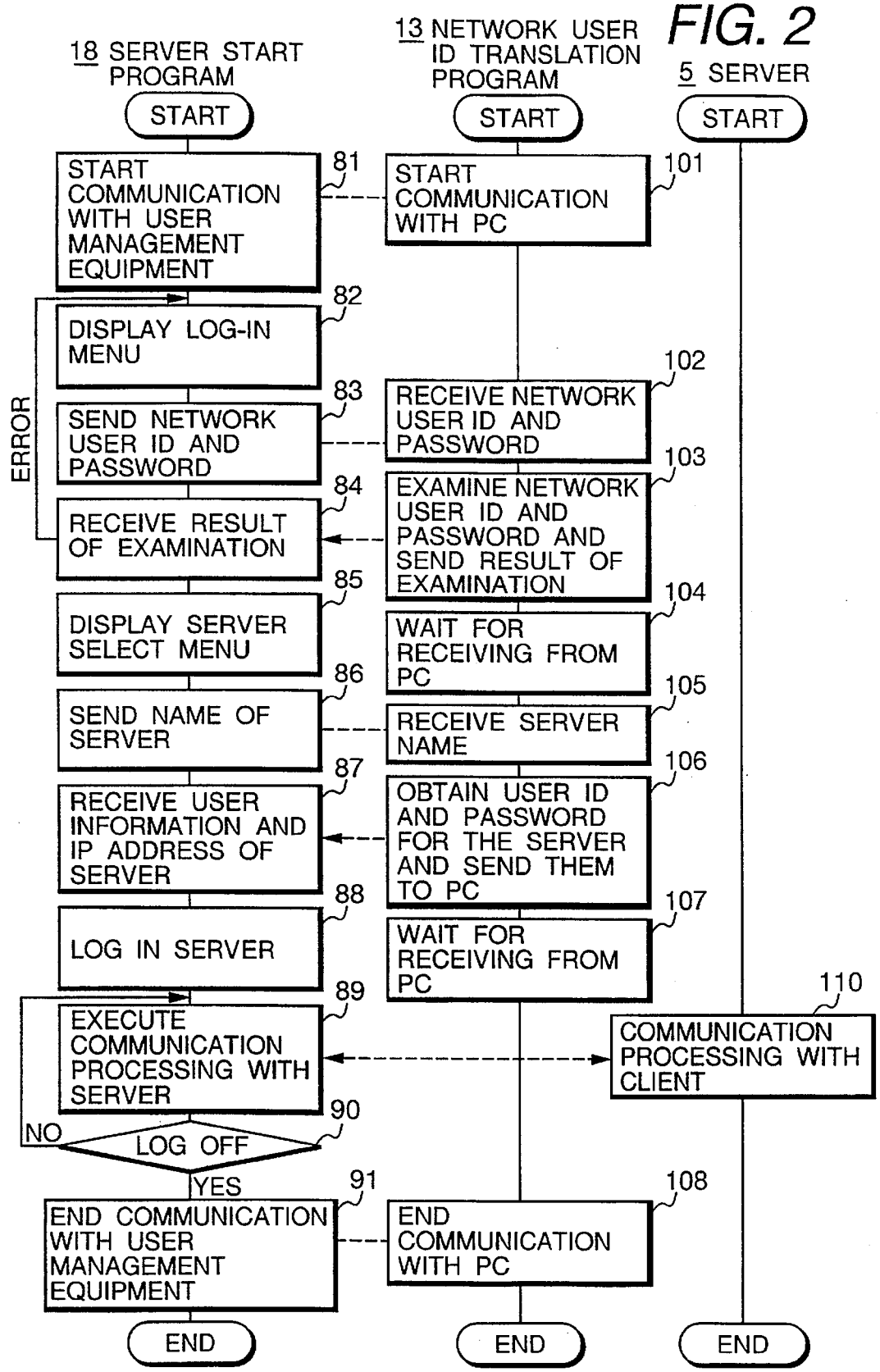
FIG. 2 is a flowchart describing the operations of a server start program (18) and a network user ID translation program (13) shown in FIG. 1.

Referring to FIG. 2, steps 81 through 91 represent a flow of the processing of the server start program 18, steps 101 through 108 represent a flow of the processing of the network user ID translation program 13 of the user management equipment 1, and step 110 represents the processing of the server.

Figure 3:
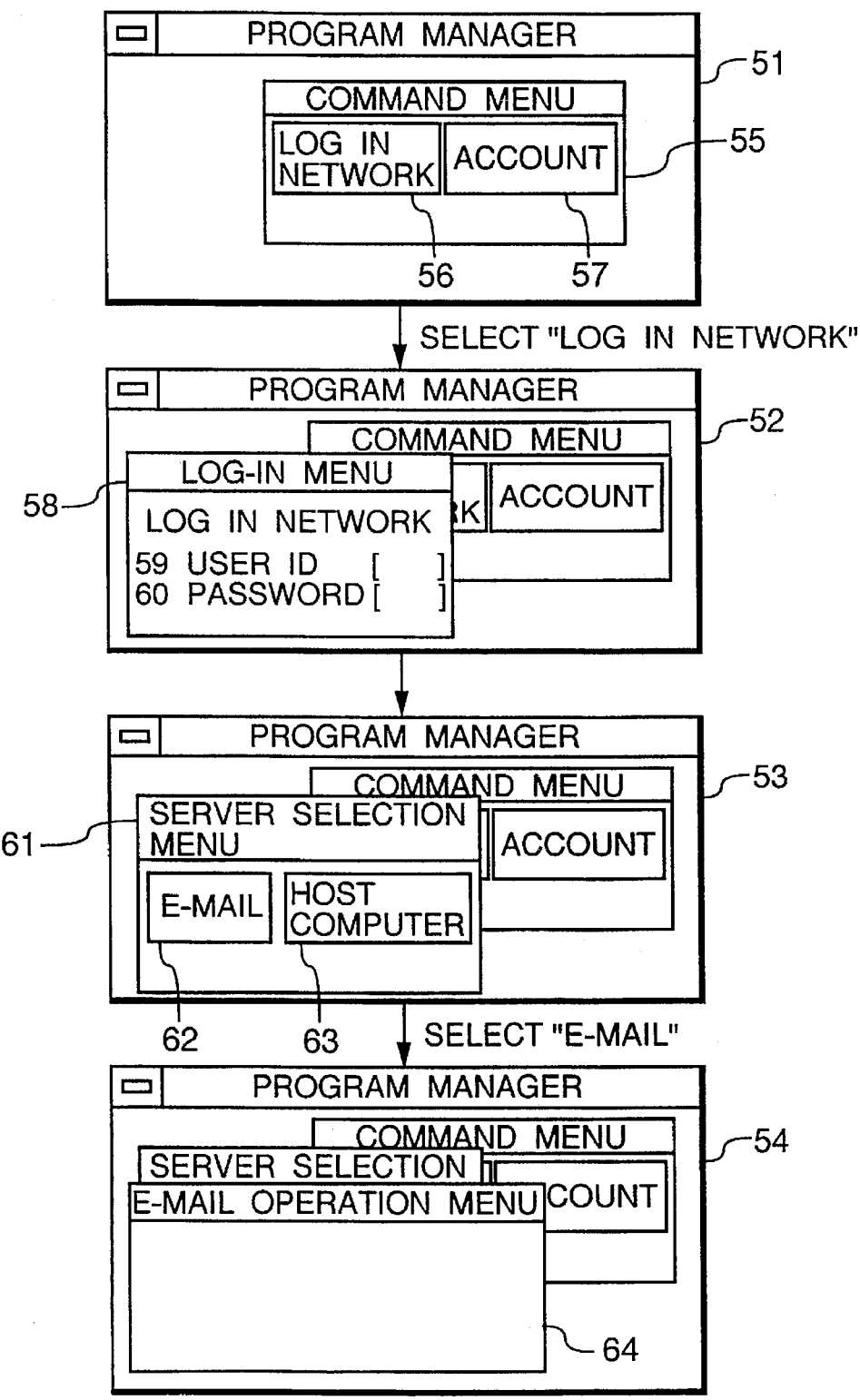
FIG. 3 is a schematic diagram illustrating the transition of screens on a terminal display device at the time when the server start program (18) shown in FIG. 1 has been started.

Normally, PC 4 displays a window 51 for the program manager on a display device 40, as shown in FIG. 3, and displays a command menu 55, a window for command entry, in the program manager window 51. Further, PC 4 displays program start icons such as a network log-in icon 56 and an account display icon 57 in the command menu 55.

When the user selects the network log-in icon 56 using a pointing device, such as a mouse, not shown, the server start program 18 of PC 4 is activated and starts communication with the network user ID translation program 13 of the user management equipment 1 (steps 81 and 101).

When activated, the server start program 18 newly displays a log-in menu 58 as shown in a screen 52 of FIG. 3 and waits for an input by the user (step 82). When the user enters the user ID 59 and password 60 for the network and presses an ENTER key, the server start program 18 passes the user network authentication information such as the entered user ID 59 and password 60 to the user management equipment 1 (steps 83 and 102). The authentication information such as the user ID and password is registered in the server start program 18 in advance and transmitted to the network user ID translation program 13 of the user management equipment 1 by means of an auto log-in capability.

The network user ID translation program 13 checks the network user management file for the network user ID and the password, and transmits the check result to the server start program 18 (step 103) and then waits for receipt of further information from PC 4 (step 104). As shown in FIG. 4, the file 2 holds a user ID 71 for the network and a password 72 for the network associated with the user registered in advance.

When the server start program 18 receives the check result (step 84), it displays a server selection menu 61 instead of the log-in menu 58, if the check has been found normal, as shown in a screen 53, and waits for an input by the user (step 85). This server selection menu 61 is for selecting a desired server from among the e-mail servers and the host computer server, which are indicated by the server icons 62 and 63, respectively.

If the check has been found abnormal, the server start program 18 goes back to step 82, displays the log-in menu 58 again, and waits for input by the user.

When the user selects one of the servers, for example one of the e-mail servers, the server start program 18 passes the name of the selected server to the network user ID translation program 13 in the user management equipment 1 (steps 86 and 105).

The network user ID translation program 13 gets the user's ID 75 and a password 76 registered for the selected server from the network management file 2. Further, the program 13 gets the network address (IP address) of the selected server from the server management file 3. The file 3 holds the network address for each of the servers as shown in FIG. 5. The network user ID translation program 13 sends these pieces of information to the server start program 18 (step 106) and then waits for receipt of further information from PC 4 (step 107).

Upon receiving the user authentication information including the ID and the password for the selected server and its network address (step 86), the server start program 18 accesses the server having the network address and automatically logs in to the server by using the received user authentication information (step 88).

This auto log-in requires sending the server to be accessed the two pieces of information, the user ID and the password contained in the user authentication information, at different times. Normally, a server sends the terminal different commands which respectively request the terminal to send a user ID and a user password. The terminal sends the user ID or the password according to the type of the command received. Therefore, for the auto log-in operation, it is necessary to store in each server beforehand the types of commands for specifying the transmission of a user ID or a password. Command 75A and command 76A in the network user management file 2 specify the transmission of the user ID 75 and the password 76, respectively. These commands are also sent to the terminal when the user ID and the password are sent from the user management equipment 1 to the terminal.

Thus, when the log-in operation is successful, PC 4 displays a window for communication with the selected server as shown in a screen 54 of FIG. 3, in this example, an e-mail operation window 64, and executes communication processing with the selected server (step 89). The communication processing by the server is indicated in step 110.

In this communication processing, the information entered in the window 64 by the user is transmitted to the server and the information received from the server is displayed on the display screen of PC 4. The communication processing is repeated until the user issues a log-off command (step 90). In this communication processing, the accessed server checks to see if the notified user authentication information is the one registered for that server. If the user authentication information is found to be registered for that server, the communication with the user continues. The user authentication for the accessed server mentioned above is necessary, because some users directly log in to the server without using the user management equipment 1.

When a log-off command is entered, the server start program 18 discontinues the communication with the server and the network user ID translation program 13 (step 91 and 108).

Subsequently, if the user selects another server through the server selection menu 61, generally the same processing as mentioned above is performed on the newly selected server. Thus, the communication with two or more different servers can be made through one server selection menu 61.

In the present preferred embodiment of the invention, the user can get the ID and the password registered for any server only by logging to in the user management equipment 1, so the user can also use various servers from a terminal that does not hold IDs and passwords for these servers.

(2) Managing user ID and other information

Figure 6:
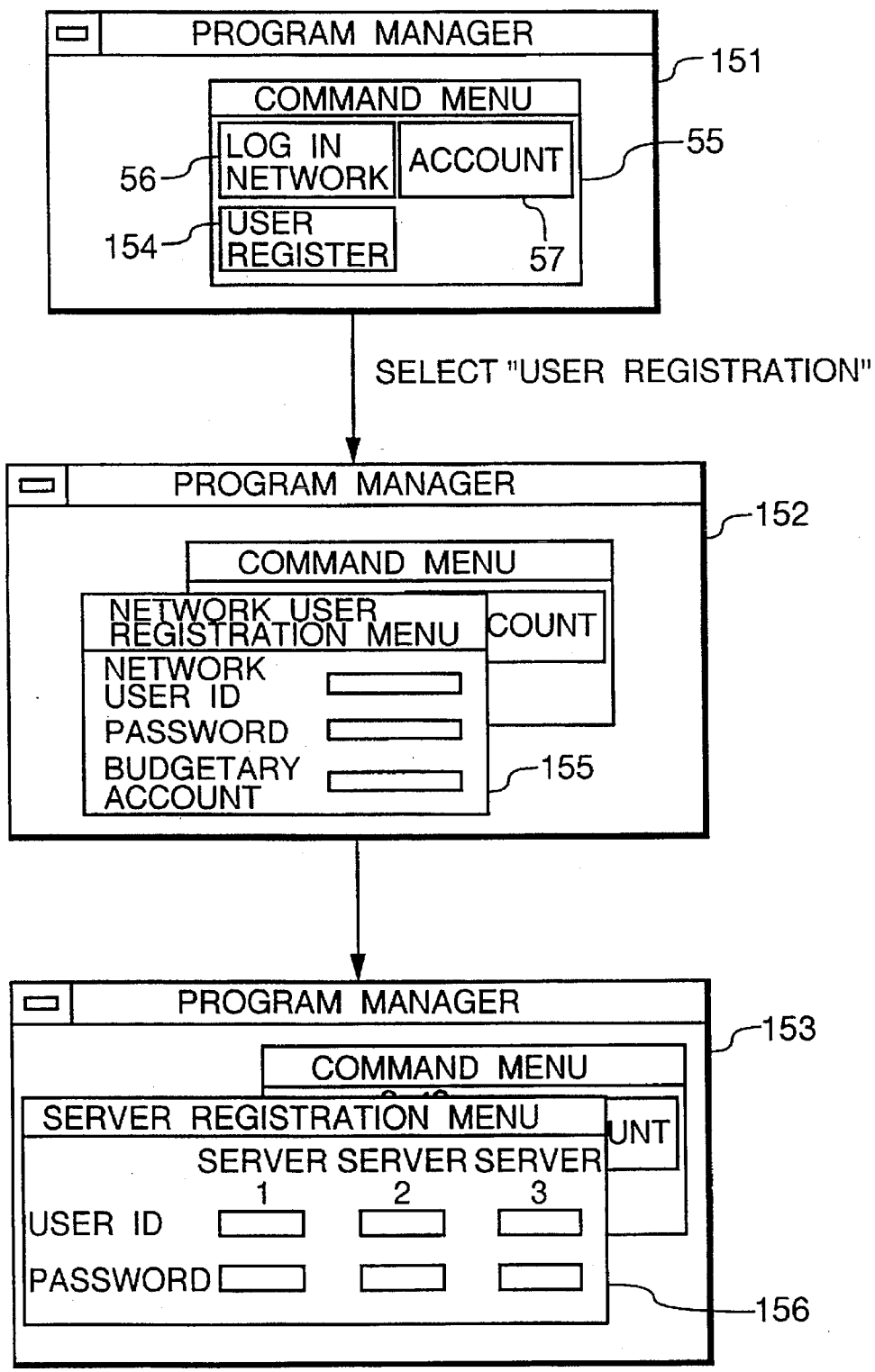
FIG. 6 is a schematic diagram illustrating the transition of screens on a display device at the time of user registration by a user ID management program (15) shown in FIG. 1.

The processing of the user ID management program 15 in the user management equipment 1 will be described by referring to FIG. 6. In the present embodiment, the information including a user ID is managed by the network manager through the user management equipment 1.

When the user management equipment is in a waiting state, a display device 1A (CRT or the like) of the user management equipment 1 shows a screen 151. The command menu 55 is a window for starting programs, in which there is the same network log-in icon 56 and account display icon 57 as those of FIG. 3, and a user registration icon 154 not found in FIG. 3 is also shown.

The user ID management program 15 is activated when the network manager performs such user management operations as user registration, change, and deletion on the display device 1A attached to the user management equipment 1. FIG. 6 shows screens for user registration. Examples of user change and deletion are performed in a similar manner and therefore are omitted from the description.

When the system manager selects the user registration icon 154 using the mouse, not shown, the user ID management program 15 is activated and a screen 152 is displayed. A network user registration menu 155 is newly displayed. This menu requires the user to enter the user ID and the password necessary for logging in to the network and a budgetary account necessary for using the network. When these pieces of data have been entered, a server registration menu 156 is displayed as shown on a screen 153. This menu requires the user to enter an ID and a password for each server to be accessed. When these pieces of information have been entered, the user ID management program 15 stores the user information entered so far into the network user management file 2 and the user management file #3 (10) of the server to be accessed.

It should be noted that the user ID management program 15 notifies each server to be accessed of the newly registered user authentication information for that server. The notified server in turn registers the authentication information for that server in to the user management file 6 or the like.

The above-mentioned operations simplify the processing necessary for user registration and the like, because the user registration conventionally made by logging in to each of the servers has been replaced by registration to the user management equipment 1.

(3) Totalizing account information

Figure 7:
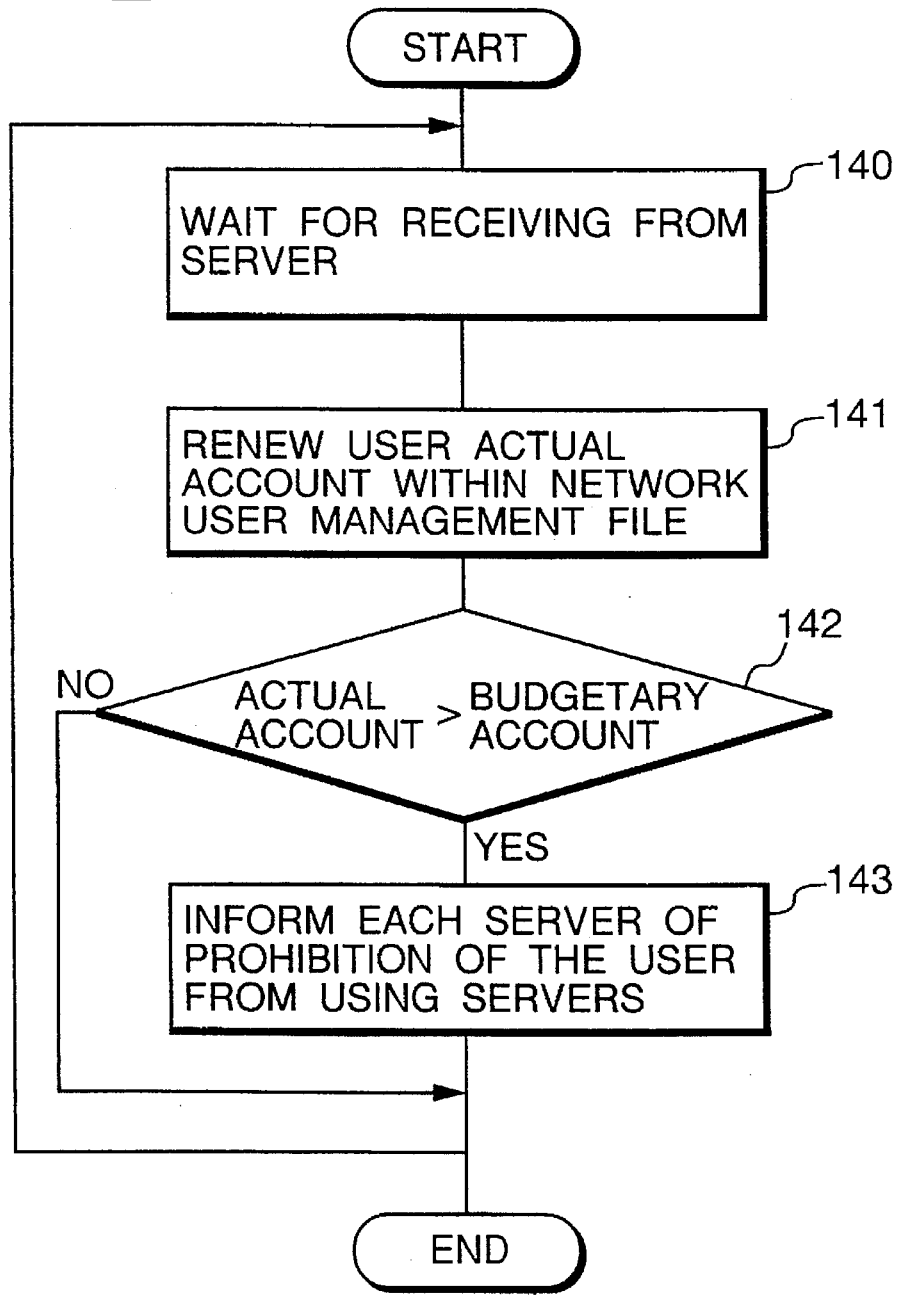
FIG. 7 is a flowchart describing the operations of an account totalizing program (16) shown in FIG. 1.

The processing flow of the account totalizing program 16 of the user management equipment 1 will be described by referring to FIG. 7. The account totalizing program 16 is activated when a user causes each of the servers to be used like the e-mail servers and the host computer server.

Normally, the account totalizing program 16 is in a state waiting for information coming from a server (step 140). When activated from the server, the account totalizing program 16 receives from the server, an actual account for the user who has just used that server, to update an actual account 77 in the network user management file 2 for that user. It should be noted that the program 16 receives from that server the user ID and password of that user for that server to determine an entry in the file 2 of the actual account 77 to be communicated (step 141). Then, the program 16 determines whether the actual account for the user has exceeded that budgetary account (step 142). If the actual account has been found to be excessive, the program 16 notifies each server to prohibit the access to that server from that user (step 143) and enters into the wait state again.

Figure 8:
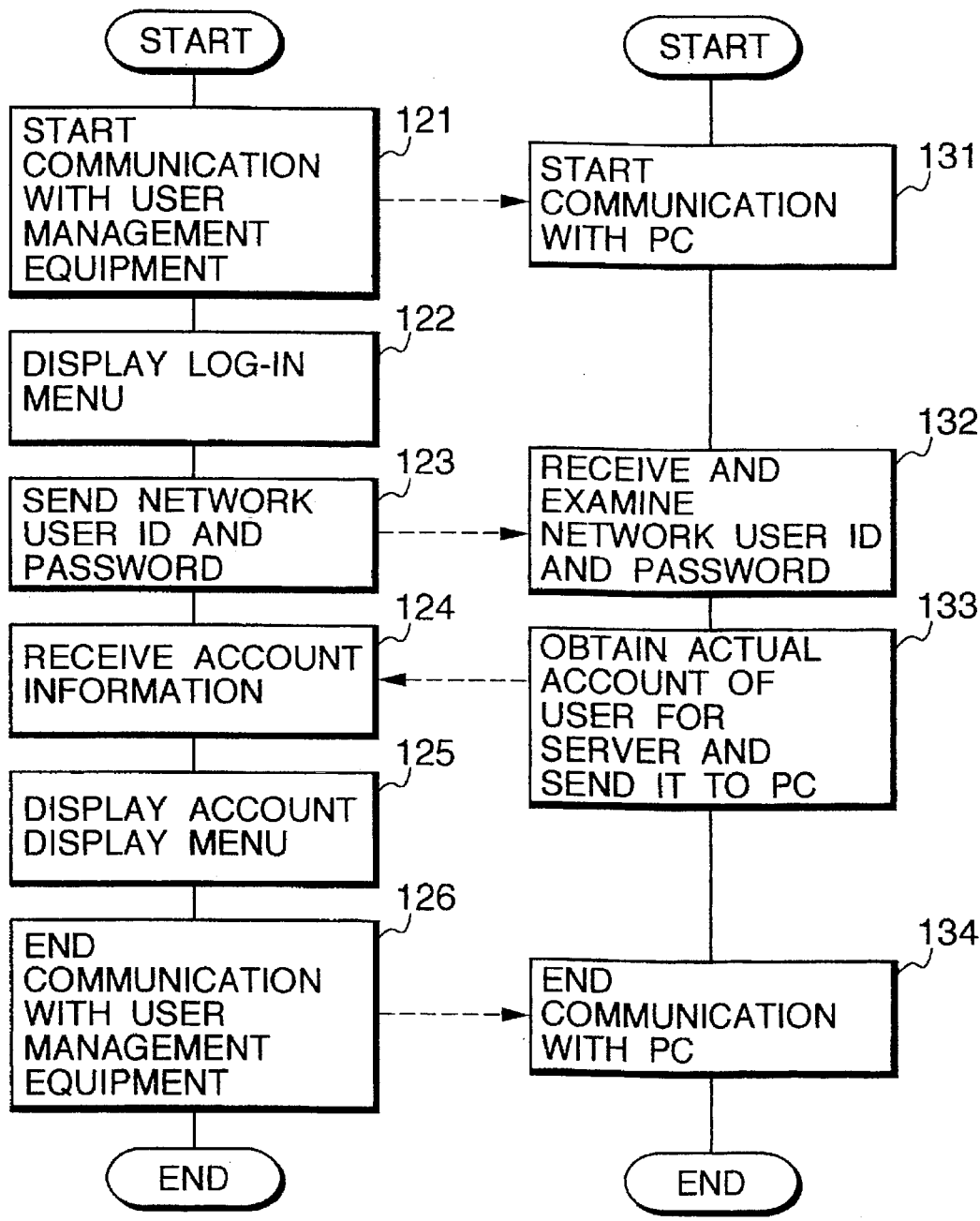
FIG. 8 is a flowchart describing the operations of account display programs (14 and 19) shown in FIG. 1.

(4) Displaying account information Now, the processing flows of the account display program 19 in PC 4 and account display program 14 in the user management equipment 1 will be described by referring to FIGS. 8 and 9. The account display program 19 is used when the user wants to know its account status S. This program displays to the user the actual accounts of all servers used by that user. The account display program 14 supplies data on the actual accounts of that user to the account display program 19. Referring to FIG. 8, steps 121 through 126 indicate the processing flow of the account display program 19, while steps 131 through 134 indicate the processing flow of the account display program 14 in the user management equipment 1.

Figure 9:
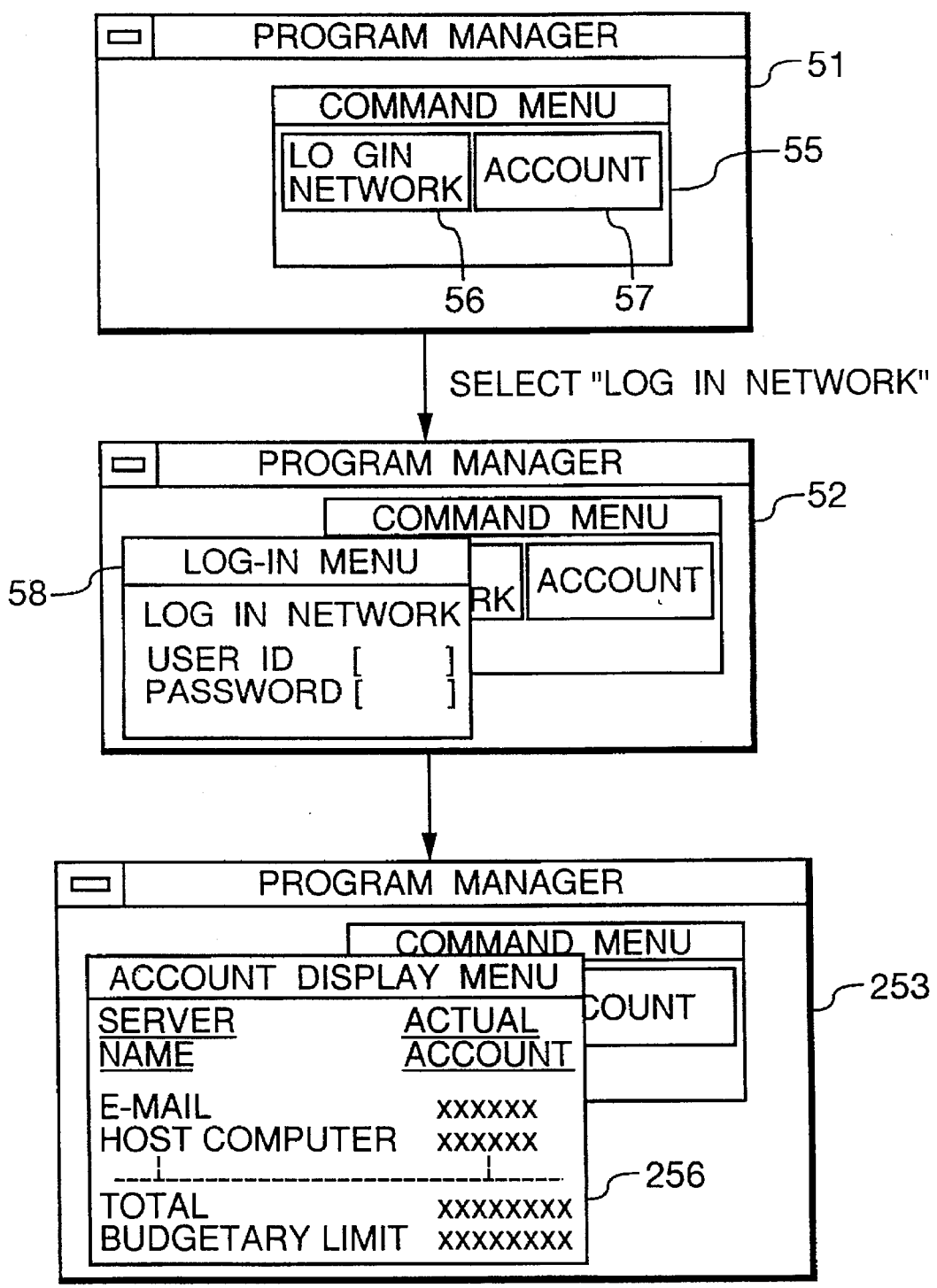
FIG. 9 is a schematic diagram illustrating the transition of terminal display screens at the time when one (19) of the account display programs has been started.

As an initial screen of the display device 40 of PC 4, a screen 51 of FIG. 9 is shown. This screen is the same as the screen 51 of FIG. 3. When the account display icon 57 is selected with the mouse, not shown, the account display program 19 is activated, thereby to communicate with the account display program 14 of the user management equipment 1 (steps 121 and 131). Then, as shown in a screen 52 of FIG. 9, the program 19 displays a log-in menu 58, and gets in the state waiting for an input by the user (step 122). This screen 52 is the same as the screen 52 of FIG. 3.

When the user enters the user ID 59 and the password 60 for logging in to the network, the account display program 19 sets a communication path with the account display program 14 of the user management equipment 1, and passes the entered user ID 59 and the password 60 to the program 14 (step 123).

Upon receiving the above-mentioned information, the account display program of the user management equipment 1 checks to see if the network user ID and password are registered in the network user management file 2 (step 132).

If the network user ID and the password have been found to be registered, the account display program 14 collects from the network user management file 2, the actual accounts of the servers used for that user and transmits the collected account information to PC 4. If the check performed in step 132 has been found to be abnormal, the program 14 notifies PC 4 thereof (step 133).

The account display program 19 of PC 4 receives the account information coming from the account display program 14 of the user management equipment 1 (step 124) and displays an account display menu 256 on the display device 40 of the PC 4 as shown in a screen of 253 of FIG. 9 (step 125). Then, the communication between the account display program 19 of PC 4 and the account display program 14 of the user management equipment 1 comes to an end (steps 126 and 134).

Thus, the user only needs to log in to the user management equipment 1 to know the account status of that user for the entire network. He needs not log in to each of the servers separately for account totalization.

Modifications:

(1) In the above-mentioned preferred embodiment of the present invention, the system manager instructs the user management equipment 1 with respect to user management such as user registration. Instead, a request for user management such as user registration may be made to the user management equipment 1 from a user terminal to make the user management equipment 1 automatically perform the above-mentioned processing for the user management described in the above-mentioned embodiment.

(2) The function to be executed by the user management equipment 1 as described in the above-mentioned embodiment may be executed by one of the servers that implements any of the systems. In this modification, user authentication information for each user, registered in that server, may be used instead of the user authentication information for the network.

(3) Instead of the LAN described in the above-mentioned embodiment, a public telephone line network may be used for the network to connect a plurality of servers.

(4) In the above-mentioned embodiment, the user management equipment 1 receives the account information for the user who has used a server, in response to activation by each server. Instead, the account totalizing program 16 may periodically access the user management file 6 or the like of the servers used to collect and totalize actual accounts for each user.

(5) In the above-mentioned embodiment, each terminal receives from the user management equipment 1 the log-in information for a server to be accessed and that terminal transmits the log-in information to that server. Instead, the user management equipment 1 may access that server and then relay the communication between the terminal and the server accessed. In this method, however, if the number of users increases, the user management equipment 1 must perform the log-in processing of all users. This sometimes results in a delay in the user management processing. In this respect, the above-mentioned embodiment is better than this variation in that no such delay is caused.

(6) In the above-mentioned embodiment, the user authentication information received from the user management equipment 1 is used to automatically log in to a server from a terminal. Instead, the user may use this authentication information to manually log in to a server.

According to the present invention, in using a plurality of servers connected to a network, user authentication information such as user IDs and passwords of formats different from a server to a server need not be registered in each user terminal.

Further, according to the present invention, when the user management such as user registration and deletion is all performed by the user management equipment 1, the user management need not be performed for each server separately.

Still further, according to the present invention, the actual accounts for the plurality of servers connected to the network may be collectively determined only by logging in to the user management equipment 1, eliminating the necessity for logging in to each of the servers separately for totalizing the accounts.

What is claimed is:

1. A method of assisting account information management in a network system which has a plurality of servers, and a network for connecting said plurality of servers, the method comprising the steps of:

gathering, by a particular one of said servers, server account information from each server for each of plural users who have authorization to access said each server via a client terminal;

holding, by said particular server, account information for each of the users, as gathered from said plurality of servers;

transmitting, by one client terminal connected to said network, to said one particular server, user authentication information predetermined for one of said users for said particular server and an account display request;

transmitting, by said particular server to said one client terminal, account information as gathered by said particular server from said plurality of servers for a user to whom said transmitted user authentication information has been assigned; and displaying said transmitted account information by said one client terminal.

2. A method according to claim 1, wherein said gathering step comprises a step of transferring account information for one of said users from one of said plurality of servers each time when said one user ceases to use said one server.

3. A method according to claim 1, wherein said gathering step comprises the steps of:

transmitting, by said particular server, an inquiry about account information to each of said plurality of servers at regular timings; and transmitting, by each of said plurality of servers to said particular server, account information for each of the users who have authority to access said each server, in response to said inquiry.

4. A method of assisting account information management for plural users of a plurality of servers constituting a network system, comprising the steps of:

(a) gathering, by a particular server within said plurality of servers, server account information from each server for each of plural users who have authorization to access said each server, said server account information representing an account to be charged to said each user for usage each of said servers;

(b) storing in said particular server (i) user authentication information for discriminating each of plural users who have authorization to use said network system, and (ii) account information for each of said plural users about an account to be charged to said each user for usage of at least one of said plurality of servers;

(c) transmitting, by a client terminal connected to said network system, to said particular server, user authentication information assigned to one of said plural users and an account display request;

(d) checking, by said particular server, a validity of said transmitted user authentication information, based upon a plurality of pieces of user authentication information each assigned to one of said plural users, as held in said particular server, and transmitting by said particular server, to said client terminal, account information held in said particular server for a user to whom said user authentication information has been assigned, in case said checking confirms validity of said transmitted user authentication information; and (e) displaying, by said client terminal, said transmitted account information in a display screen within said client terminal.

5. A method according to claim 4, further comprising the steps of:

holding, in said particular server, a budgetary limit for each of said users on a sum of accounts for respective servers for said each user;

updating, by said particular server, account information held therein for each user, each time when said each user uses one of said plurality of servers, said updating being executed depending upon amount of actual usage, of said one server;

judging, by said particular server, whether an actual account to be charge to said each user has exceeded said budgetary limit held for said each user, based upon said updated account information; and limiting subsequent use of one of said plurality of servers by said each user, when said actual account has exceeded said budgetary limit.

6. A method according to claim 5, wherein said limiting step comprises the steps of:

informing, by said particular server, each server that an actual account for one of said users has exceeded said budgetary limit held for said user; and limiting, by each server, subsequent use of said each servers by said one user.

7. A method of assisting in obtaining access by a client computer to a plurality of servers which are connected by a network, comprising the steps of:

logging in a predetermined one of said plurality of servers, by a client computer, connected to said network, in response to a request by a user, by sending to said predetermined server first user authentication information predetermined for use by said user for accessing said predetermined server, wherein each of said plurality of servers, other than said predetermined server, holds a plurality of second user authentication information each predetermined for access to the respective server by a user who is permitted to access said server, and wherein said predetermined server holds said plurality of second user authentication information stored in said plurality of servers, other than said predetermined server;

transferring a request from said client computer to said predetermined server for second user authentication information predetermined for use by said user for accessing one of said plurality of other servers which said user has selected;

transmitting, from said predetermined server, said requested second user authentication information to said client computer for use in accessing said selected server;

logging in said user selected server, by said client computer, using said transmitted second user authentication information; and updating at least one second user authentication information for a user for one of said other servers, said updating step including the steps of:
  (a) updating a portion of said plurality of second user authentication information held by said predetermined server, with respect to said at least one second user authentication information for said user for access to said other one server, and
  (b) transferring, from said predetermined server, said updated portion of said second user authentication information held thereby to said other one server, to update a plurality of second user authentication information held thereby, which is predetermined for said user for access to said other one server.

8. A method according to claim 7, wherein said updating step further includes a step of adding new user authentication information to said plurality of user authentication information held by said predetermined server for said plurality of servers other than said predetermined server, said new user authentication information being determined for a user who has been newly admitted to access one of said plurality of servers other than said predetermined server.

9. A method according to claim 7, wherein said step of updating said plurality of user authentication information held by said predetermined server is executed by operations of a system manager.

10. A method of assisting in obtaining access from a client computer to a plurality of servers which are connected by a network, comprising the steps of:

logging in a predetermined one of said plurality of servers, by a client computer, connected to said network, in response to a request by a user, by sending to said predetermined server first user authentication information predetermined for use by said user for accessing said predetermined server, wherein each of said plurality of servers, other than said predetermined server, holds a plurality of second user authentication information each predetermined for access to the respective server by a user who is permitted to access said server, wherein said predetermined server holds (a) said plurality of second user authentication information for said plurality of servers, other than said predetermined server, and (b) a plurality of server addresses of said plurality of servers;

transmitting a request from said client computer to said predetermined server for transfer of second user authentication information predetermined for said user to effect access to one of said plurality of other servers which said user has selected;

transmitting, from said predetermined server to said client computer, said requested second user identification information and one of said plurality of server addresses corresponding to said user selected server; and logging in said user selected server, by said client computer, using said transmitted server address and said transmitted second user identification information.

11. A method of assisting in obtaining access by a client computer to a plurality of servers which are connected by a network, comprising the steps of:

logging in a predetermined one of said plurality of servers, by a client computer, connected to said network, in response to a request by a user, by sending to said predetermined server first user authentication information predetermined for use by said user for accessing said predetermined server, wherein said plurality of servers include servers which transmit commands which are different from each other depending upon said servers when said servers request user authorization information, each of said plurality of servers, other than said predetermined server, holding a plurality of second user authentication information each predetermined for access to the respective server by a user who is permitted to access said server wherein said predetermined server holds (a) the plurality of second user authentication information predetermined for said plurality of servers, other than said predetermined server, and (b) a plurality of commands predetermined for said plurality of other servers; each of said plurality of commands predetermined for a corresponding one of said plurality of other servers being a command which said one server transmits when said one server requests user authorization information;

transmitting a request from said client computer to said predetermined server for transfer of second user identification information predetermined for use by said user to access one of said plurality of said client computer said requested second user identification information and one of said plurality of commands predetermined for use by said user selected server; and logging in said user selected server, by said client computer, by sending said transmitted second user identification information to said user selected server from said client computer, in response to receipt of the same command from said user selected server as said one command transmitted from said predetermined server.

* * * * *